(12) United States Patent
McCracken et al.

(10) Patent No.: US 8,302,519 B2
(45) Date of Patent: Nov. 6, 2012

(54) HAND-HELD POWER TOOL

(75) Inventors: Robert E. McCracken, Anderson, SC (US); Ryan T. Harrison, Anderson, SC (US)

(73) Assignee: Techtronic Power Tools Technology Limited, Tortola (VG)

( * ) Notice: Subject to any disclaimer, the term of this patent is extended or adjusted under 35 U.S.C. 154(b) by 365 days.

(21) Appl. No.: 12/353,354

(22) Filed: Jan. 14, 2009

(65) Prior Publication Data
US 2010/0162867 A1  Jul. 1, 2010

Related U.S. Application Data

(60) Provisional application No. 61/141,737, filed on Dec. 31, 2008.

(51) Int. Cl.
*B23D 33/02* (2006.01)
(52) U.S. Cl. ............ 83/473; 83/581; 30/390; 30/392
(58) Field of Classification Search .......... 30/473, 30/375, 376–377, 388, 390, 391, 371, 392, 30/273, 275.4; 83/473, 581, 953, 582, 659; D8/98, 66, 71, 80; 125/13.03, 16.04, 13.01; 144/48.5, 48.6; 451/360; 409/211
See application file for complete search history.

(56) References Cited

U.S. PATENT DOCUMENTS

| | | | |
|---|---|---|---|
| 1,585,535 A * | 5/1926 | Crogan | 30/371 |
| 1,806,582 A | 5/1931 | Beutner | |
| 1,942,766 A | 1/1934 | O'Banion | |
| 2,139,272 A | 12/1938 | Jaworski | |
| 2,367,432 A | 1/1945 | Reprogle | |
| 3,385,330 A * | 5/1968 | Haynes | 83/799 |
| 3,468,350 A * | 9/1969 | Logan | 30/377 |
| 3,690,356 A * | 9/1972 | Holan | 144/136.1 |
| 4,349,928 A | 9/1982 | Mlikotin | |
| 4,461,330 A * | 7/1984 | Judkins | 144/154.5 |
| 4,555,849 A | 12/1985 | Ando et al. | |
| 4,976,034 A | 12/1990 | Whitman | |
| 4,993,243 A | 2/1991 | Guinn | |
| 5,012,582 A | 5/1991 | Bristol et al. | |
| 5,150,993 A * | 9/1992 | Miller | 408/110 |
| 5,331,743 A | 7/1994 | Lump | |
| 5,692,426 A * | 12/1997 | Alexander | 83/466 |
| 5,743,686 A * | 4/1998 | Montgomery | 409/181 |
| 5,974,674 A | 11/1999 | Kelly | |
| 6,256,891 B1 * | 7/2001 | Van Camp et al. | 30/392 |
| 6,470,576 B2 | 10/2002 | Watson | |
| 6,561,063 B1 | 5/2003 | Mulford et al. | |
| 6,722,046 B2 | 4/2004 | Evenson | |
| 6,775,913 B2 | 8/2004 | Fey et al. | |
| 6,785,971 B2 | 9/2004 | McDonnell | |
| 6,996,909 B1 | 2/2006 | Buck et al. | |
| 7,131,205 B2 | 11/2006 | McDonnell | |
| 7,225,545 B2 | 6/2007 | Blatz | |
| 7,287,454 B2 | 10/2007 | McIntosh | |
| 7,343,683 B2 | 3/2008 | Buck et al. | |

(Continued)

*Primary Examiner* — Boyer D Ashley
*Assistant Examiner* — Omar Flores Sanchez
(74) *Attorney, Agent, or Firm* — Michael Best & Friedrich LLP

(57) ABSTRACT

A power tool includes an electric motor, a motor housing in which the electric motor is at least partially positioned, a blade drivably coupled to the motor for rotation about a first axis, and a blade housing in which the blade is at least partially positioned. The blade and the blade housing are pivotably coupled to the motor housing about a second axis substantially parallel to the first axis.

22 Claims, 7 Drawing Sheets

U.S. PATENT DOCUMENTS

D626,398 S * 11/2010 Lau et al. .................. D8/107
2005/0097760 A1    5/2005 McDonnell
2006/0064881 A1    3/2006 Blatz
2007/0240892 A1   10/2007 Brotto et al.
2008/0006136 A1    1/2008 McIntosh

* cited by examiner
HAND-HELD POWER TOOL

RELATED APPLICATIONS

This application claims priority to U.S. Provisional Patent Application Ser. No. 61/141,737 filed on Dec. 31, 2008, the entire content of which is incorporated herein by reference.

BACKGROUND OF THE INVENTION

The present invention relates to power tools, and more particularly to hand-held power tools.

Miter joints are typically employed to connect two work pieces to each other at an angle (e.g., 45 or 90 degrees). Such miter joints are typically created by cutting the edges of the respective work pieces at an angle that is one half of the desired included angle between the work pieces, and then joining the work pieces along their respective beveled edges. Miter saws are typically utilized to perform such miter cuts on work pieces. Miter saws, however, are typically large and bulky tools that remain stationary or at a fixed location on a job site, requiring frequent travel to and from the miter saw by users of the miter throughout the workday.

SUMMARY OF THE INVENTION

The present invention provides, in one aspect, a power tool including an electric motor, a motor housing in which the electric motor is at least partially positioned, a blade drivably coupled to the motor for rotation about a first axis, and a blade housing in which the blade is at least partially positioned. The blade and the blade housing are pivotably coupled to the motor housing about a second axis substantially parallel to the first axis.

The present invention provides, in another aspect, a power tool including an electric motor, a blade drivably coupled to the motor for rotation about a first axis, a base including a motor housing in which the electric motor is at least partially positioned, and a fence supported by the base for rotation about a second axis substantially normal to the first axis. The motor housing is shaped to be grasped by an operator of the power tool to hold and support the weight of the power tool when in use.

The present invention provides, in yet another aspect, a power tool including an electric motor, a blade drivably coupled to the motor for rotation about a first axis, a base pivotably coupled to the blade about a second axis substantially parallel to the first axis, and a fence supported by the base for rotation about a third axis substantially normal to the first and second axes. The base includes a handle shaped to be grasped by an operator of the power tool to hold and support the weight of the power tool when in use.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
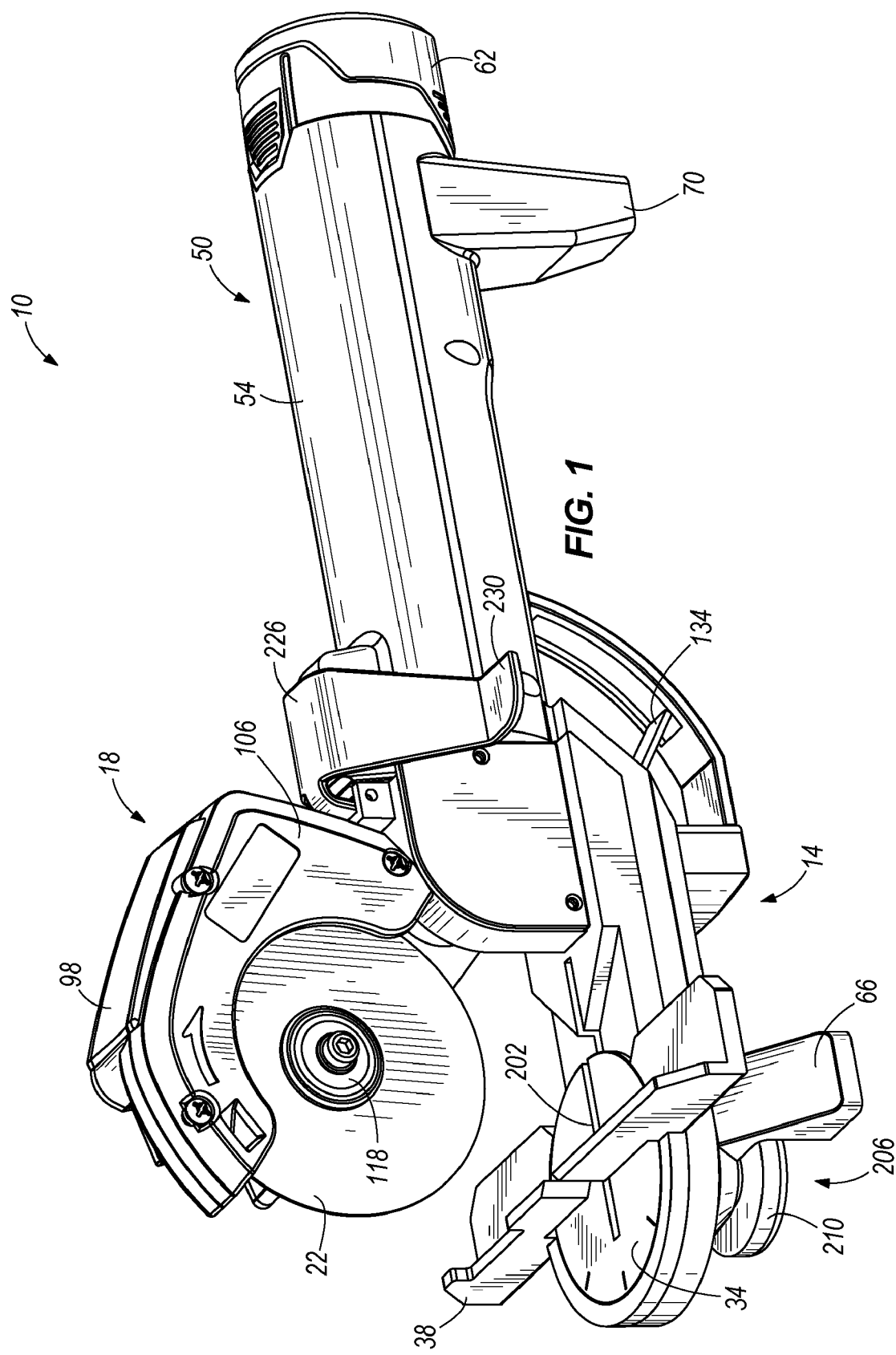
FIG. 1 is a front perspective view of a miter saw according to one construction of the invention.
Figure 2:
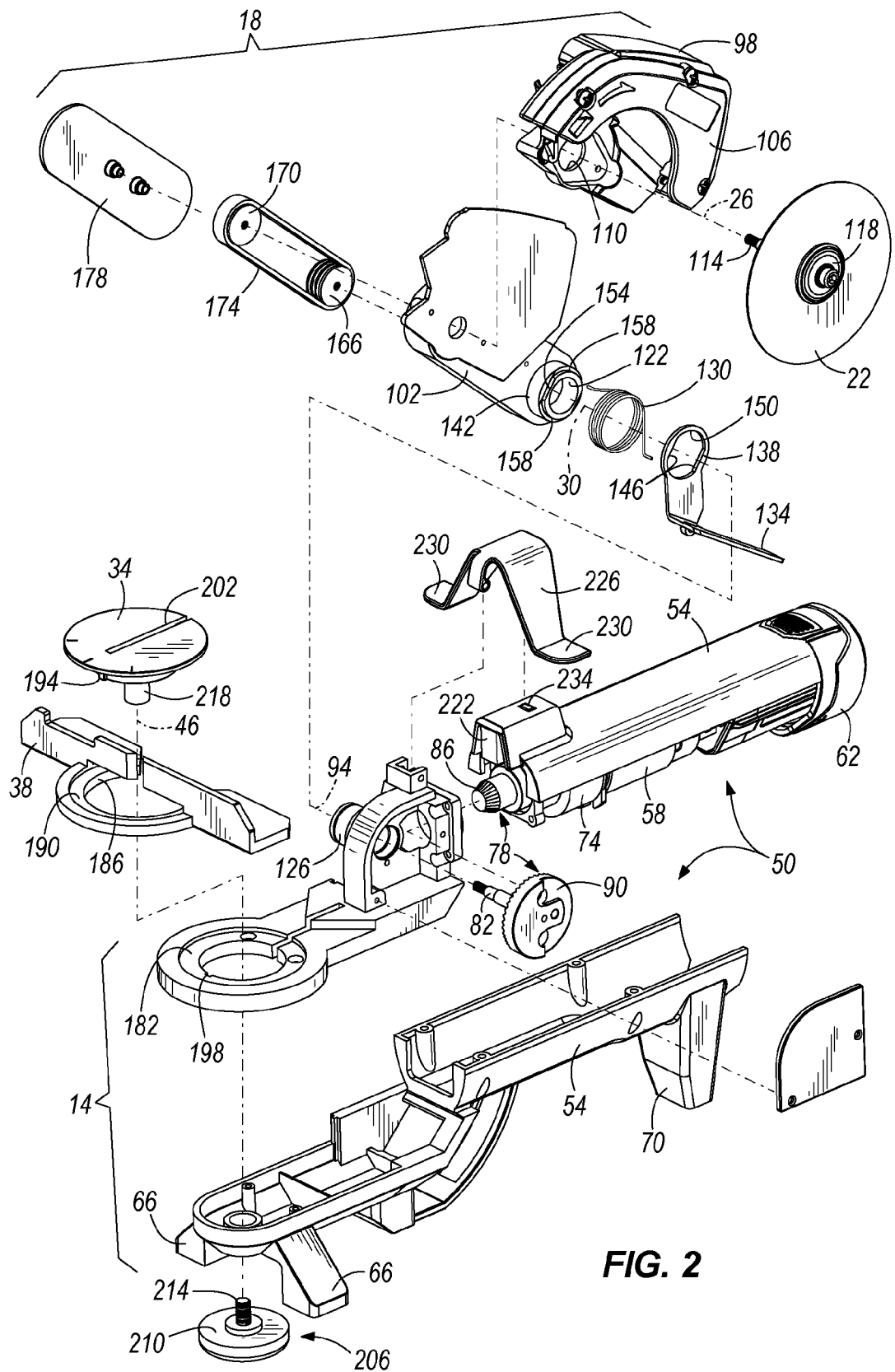
FIG. 2 is an exploded perspective view of the miter saw of FIG. 1.
Figure 3:
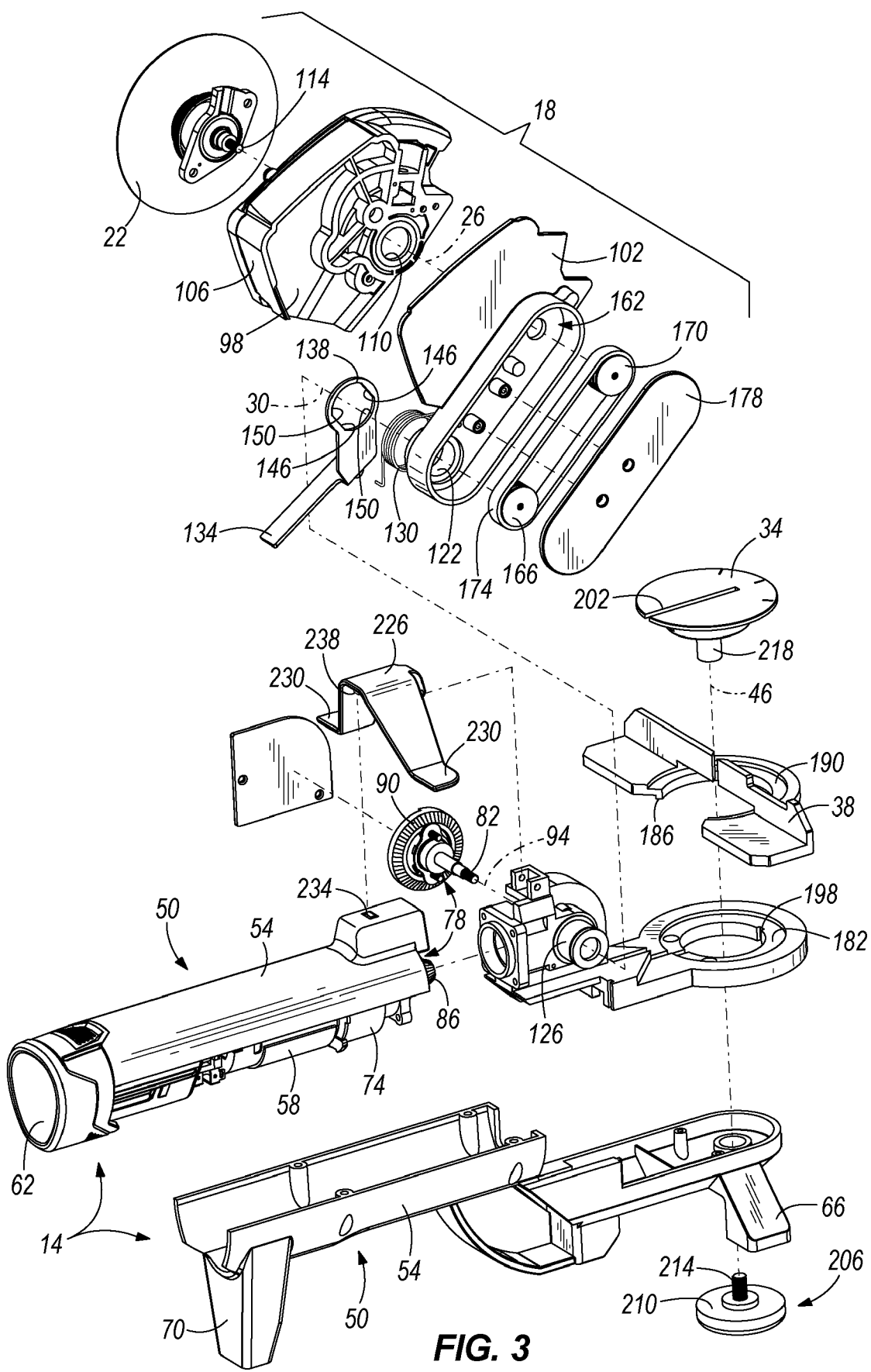
FIG. 3 is a reverse exploded perspective view of miter saw of FIG. 1.
Figure 4:
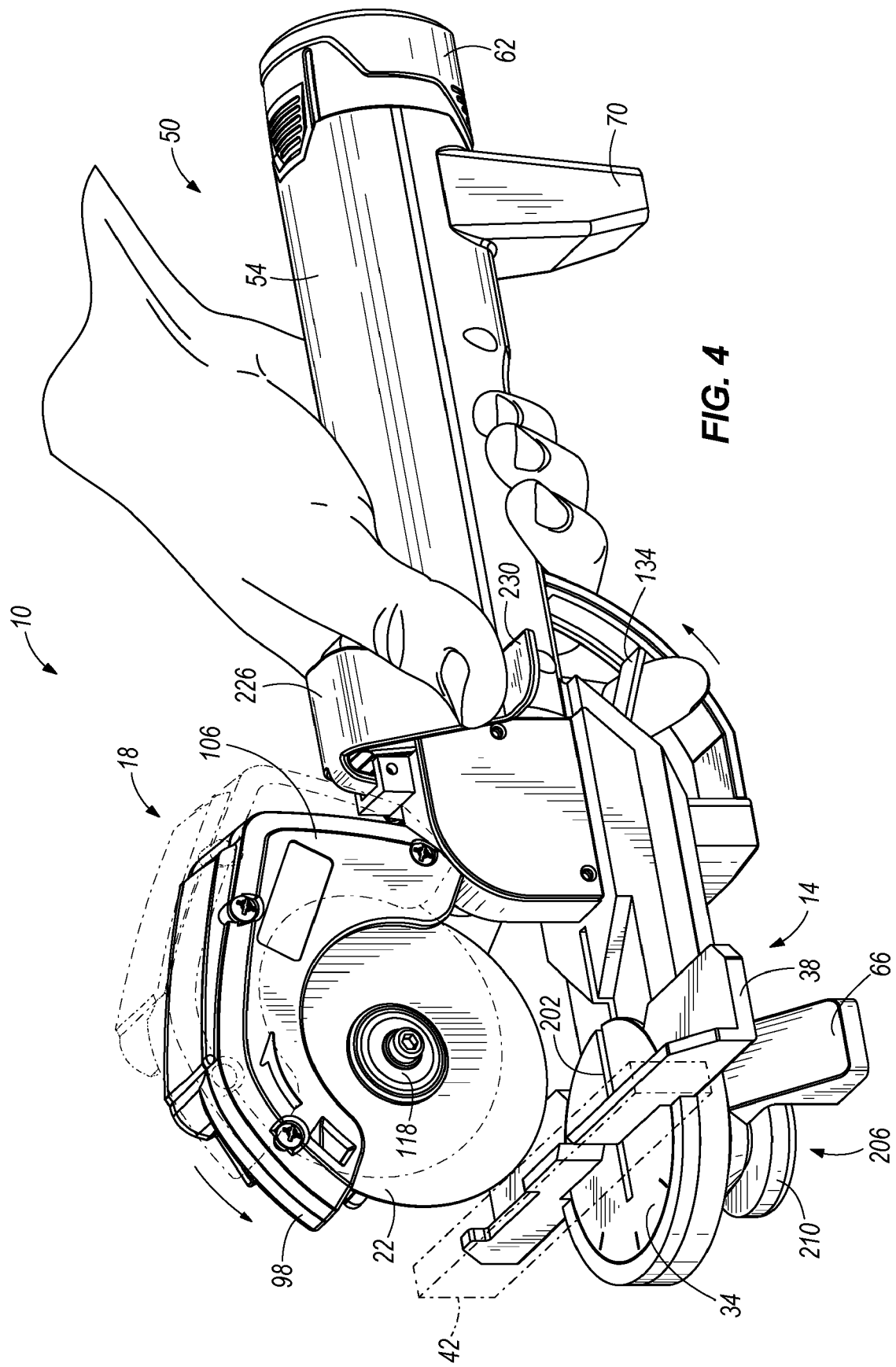
FIG. 4 is a front perspective view of the miter saw of FIG. 1, illustrating a user of the miter saw lowering a blade against a work piece.

FIG. 1 illustrates a hand-held power tool 10 including a base 14 and a saw unit 18 pivotably coupled to the base 14. Particularly, the saw unit 18 includes a blade 22 rotatable about a first axis 26, and the saw unit 18 is pivotably coupled to the base 14 about a second axis 30 offset from the first axis 26 and substantially parallel to the first axis 26 (FIGS. 2 and 3). With continued reference to FIGS. 2 and 3, the power tool 10 also includes a table 34 and a fence 38 supported by the base 14 upon and against which, respectively, a work piece 42 may be positioned (FIG. 4). With reference to FIGS. 2 and 3, the fence 38 is pivotable relative to the base 14, the table 34, and the saw unit 18 about a third axis 46 oriented substantially normal to the first and second axes 26, 30. In this manner, the hand-held power tool 10 is operable as a hand-held miter saw for performing straight cuts (i.e., a cut oriented transversely to the length of the work piece 42) or miter cuts (i.e., a cut oriented obliquely to the length of the work piece 42) on work pieces 42. In another construction, the fence 38 may be rigidly connected with or integrally formed with the base 14 and/or table 34, such that the power tool 10 would be operable only to perform straight cuts on work pieces 42.

In a further construction, the power tool 10 may be configured as a hand-held compound miter saw operable to perform bevel cuts (i.e., a cut oriented obliquely to the thickness of the work piece 42) in work pieces 42 in addition to miter cuts. As yet another construction, the power tool 10 may be configured as a hand-held sliding miter saw in which the saw unit 18 is operable to slide in a linear direction from a rearward position to a forward position to perform straight cuts and miter cuts on work pieces 42. Furthermore, the power tool 10 may be configured as a hand-held sliding compound miter saw, incorporating each of the features described above to perform straight cuts, miter cuts, and bevel cuts on work pieces 42.

With reference to FIGS. 1 and 4, the base 14 includes an elongated handle 50 shaped to be grasped by an operator with a single hand (FIG. 4). In the illustrated construction of the power tool 10, the handle 50 also includes a motor housing 54 supporting an electric motor 58 and a battery 62 electrically connected to the motor 58 (FIGS. 2 and 3). Alternatively, the motor 58 may be positioned in another location of the power tool 10 (e.g., in the saw unit 18 to directly drive the blade 22). The battery 62 may be configured having any of a number of different voltages (e.g., 4 volts, 12 volts, 18 volts, etc.) depending upon the range of applications of the power tool 10 and may utilize any of a number of different chemistries (e.g., lithium-ion, nickel-cadmium, etc.). The battery 62 is also removable from the handle 50 for charging by a separate battery charger. However, in another construction of the power tool 10, the battery 62 may be enclosed within the handle 50 and non-removable from the power tool 10. In such a construction, the power tool 10 may also incorporate a battery charging circuit to charge the internal battery 62. Alternatively, the power tool 10 may include a power cord (not shown) to electrically connect the motor 58 to a remote power source (e.g., household line alternating current available from a power outlet) rather than incorporating an onboard direct current power source (i.e., the battery 62). The battery 62 may also be interchangeable with a variety of other power tools to supply power to the power tools (e.g., saws, drills, flashlights, etc.). The power tool 10 may also include a second handle (not shown) obliquely or transversely oriented relative to the elongated handle 50 of the base 14 to facilitate grasping of the power tool 10 by an operator when the power tool 10 is in use. Such a handle may be removable from the base 14 utilizing a threaded or other structural connection.

With reference to FIG. 1, the base 14 also includes a plurality of feet 66, 70 with which to support the power tool 10 when the power tool 10 is placed on a support surface (e.g., the ground). In the illustrated construction of the power tool 10, two feet 66 are positioned forward of the saw unit 18, while the third foot 70 is positioned rearward of the saw unit 18. As such, the feet 66, 70 define three points of contact with the underlying support surface of the power tool 10 by which to provide stable placement of the power tool 10 on the support surface. In another construction, the power tool 10 may include any of a number of different feet with which to support the power tool 10 on a support surface. As a further construction, the power tool 10 may include a clip (not shown) configured to engage a corresponding clip or a holster on a power tool belt of the operator to support the power tool 10 from the power tool belt, or the power tool 10 may include a clip configured to directly engage or hook onto the power tool belt to support the power tool 10.

With continued reference to FIGS. 2 and 3, the power tool 10 includes a planetary transmission 74 drivably coupled to an output shaft (not shown) of the motor 58 to reduce the output speed of the motor 58 and increase the torque output of the motor 58. The power tool 10 also includes a bevel gear train 78 drivably coupled to the planetary transmission 74 and operable to transfer torque from the motor 58 and the planetary transmission 74 to an output shaft 82 oriented substantially normal to the output shaft of the motor 58. Specifically, the bevel gear train 78 includes a pinion 86 coupled to a carrier of the planetary transmission 74 and a bevel gear 90 supported by the base 14 for rotation about an axis 94 oriented substantially normal to the output shaft of the motor 58. One or more friction-reducing components (e.g., roller bearings, bushings, etc.) may be utilized between the output shaft 82 of the bevel gear train 78 and the base 14 to facilitate rotation of the bevel gear 90 and the output shaft 82 relative to the base 14.

With continued reference to FIGS. 2 and 3, the saw unit 18 includes a blade housing 98 and a transmission housing 102 coupled to the blade housing 98 and pivotably coupled to the base 14. In the illustrated construction of the power tool 10, the blade housing 98 and transmission housing 102 are separate and distinct components. Alternatively, the blade housing 98 and transmission housing 102 may be integrally formed as a single piece. The blade housing 98 includes an upper blade guard 106 surrounding an upper portion of the blade 22 (FIG. 1) and a mount 110 in which a spindle 114 (FIGS. 2 and 3) fixed for co-rotation with the blade 22 is supported for rotation about the first axis 26 by one or more friction-reducing components (e.g., roller bearings, bushings, etc.). The spindle 114 may include a chuck 118 to facilitate changing the blade 22 of the power tool 10 when so desired (FIG. 2).

With reference to FIG. 3, the transmission housing 102 includes an aperture 122 through which a cylindrical mount 126 on the base 14 is received. In operation of the power tool 10, the blade housing 98 and the transmission housing 102 are pivotable relative to the base 14 via the cylindrical mount 126. One or more friction-reducing components (e.g., roller bearings, bushings, etc.) may be utilized between the cylindrical mount 126 on the base 14 and the transmission housing 102 to facilitate pivoting of the transmission and blade housings 102, 98 relative to the base 14 about the second axis 30. In a further construction, different structure may be employed to facilitate pivoting of the transmission and blade housings 102, 98 relative to the base 14. With reference to FIGS. 2 and 3, the power tool 10 includes a torsion spring 130 interconnecting the base 14 and the transmission housing 102 to bias the saw unit 18 toward an upper or raised position (e.g., position of the saw unit 18 shown in FIG. 1). In a further construction, one or more linear springs (e.g., compression or tension springs) may be utilized in place of the torsion spring 130 or to supplement the torsion spring 130 to bias the saw unit 18 toward its upper or raised position.

With continued reference to FIGS. 2 and 3, the power tool 10 also includes a lever 134, fixed for co-rotation with the transmission housing 102, which is actuated by the user of the power tool 10 to pivot the saw unit 18 downwardly about the second axis 30 when performing a cut on the work piece 42. In the illustrated construction of the power tool 10, the lever 134 includes a non-cylindrical aperture 138 through which a corresponding non-cylindrical boss 142 of the transmission housing 102 is received (FIG. 2). Specifically, the non-cylindrical aperture 138 in the lever 134 includes opposed, substantially parallel surfaces 146 adjacent respective arcuate surfaces 150, and the non-cylindrical boss 142 of the transmission housing 102 includes corresponding opposed, substantially parallel surfaces 154 adjacent respective arcuate surfaces 158. The respective opposed, substantially parallel surfaces 146, 154 of the lever 134 and the transmission housing boss 142 engage when the transmission housing boss 142 is received in the aperture 138. Likewise, the respective arcuate surfaces 150, 158 of the lever 134 and the transmission housing boss 142 engage when the transmission housing boss 142 is received in the aperture 138. In this manner, the lever 134 is fixed for co-rotation with the transmission housing 102 relative to the base 14 about the second axis 30. In another construction, different structure may be employed between the lever 134 and the transmission housing 102 to fix the lever 134 for co-rotation with the transmission housing 102 (e.g., using a key and keyway arrangement, splines, an interference fit, etc.). Further, the lever 134 and the transmission housing 102 may be permanently joined (e.g., using adhesives, a welding process, etc.), or the lever 134 and the transmission housing 102 may be integrally formed as a single piece.

With reference to FIG. 3, the transmission housing 102 includes a cavity 162 in which a drive pulley 166, a driven pulley 170, and a belt 174 interconnecting the drive pulley 166 and the driven pulley 170 are positioned. A cover 178 is coupled to the transmission housing 102 (e.g., using fasteners, etc.) to substantially enclose the pulleys 166, 170 and the belt 174 in the cavity 162. The drive pulley 166 is coupled for co-rotation with the output shaft 82 of the bevel gear train 78, while the driven pulley 170 is coupled for co-rotation with the spindle 114. Any of a number of different features or processes (e.g., using a key and keyway arrangement, splines, an interference fit, adhesives, welding, etc.) may be utilized to couple the drive pulley 166 with the output shaft 82 of the bevel gear train 78 and the driven pulley 170 with the spindle 114, respectively. In a further construction, a chain may be substituted for the belt 174, and gears may be substituted for the respective pulleys 166, 170, or a gear train may be utilized in place of the pulleys 166, 170 and the belt 174. In a construction of the power tool 10 in which the motor 58 is located in the saw unit 18 to directly drive the blade 22, the bevel gear train 78, the pulleys 166, 170, and the belt 174 may be omitted.

In operation of the power tool 10, the wrapping of the belt 174 on the respective pulleys 166, 170 changes as the saw unit 18 is pivoted downwardly by the operator when performing a cut on a work piece 42. Although approximately one-half of the outer periphery of each of the pulleys 166, 170 is wrapped by the belt 174 at any given time during operation of the power tool 10, the portion of the outer periphery of each of the pulleys 166, 170 that is wrapped by the belt 174 changes as the belt 174 rotates about the second axis 30 with the transmission and blade housings 102, 98 when the saw unit 18 is pivoted relative to the base 14 prior to activation of the motor 58.

With reference to FIGS. 2 and 3, the base 14 includes a cylindrical recess 182 in which a downwardly-projecting lip 186 of the fence 38 having a corresponding cylindrical shape (FIG. 3) is positioned to limit the degree of freedom between the fence 38 and the base 14 to rotation about the third axis 46. Further, the fence 38 includes a cylindrical recess 190 in which the table 34 is positioned to limit the degree of freedom between the fence 38 and the table 34 to rotation about the third axis 46 (FIG. 2). In the illustrated construction of the power tool 10, the fence 38 is rotatable about the third axis 46 at least about 90 degrees (i.e., 45 degrees in a clockwise direction and 45 degrees in a counter-clockwise direction relative to the orientation of the fence 38 shown in FIG. 1). Alternatively, the fence 38 may be rotatable relative to the table 34 and base 14 more than 90 degrees. In further constructions, the power tool 10 may include a plurality of detents between the fence 38 and the table 34 or base 14 corresponding to typical miter angles (e.g., 0 degrees, ±22.5 degrees, ±45 degrees, ±30 degrees, ±60 degrees, etc.) to facilitate quick and precise adjustment of the fence 38 relative to the table 34 and base 14.

With reference to FIG. 2, the table also includes a radial projection or key 194 sized to be received within a corresponding keyway 198 in the base 14. The engagement of the key 194 and keyway 198 prevents the table 34 from rotating relative to the base 14, however, the engagement of the key 194 and keyway 198 does not prevent the table 34 from moving linearly along the third axis 46 relative to the base 14 (discussed in more detail below). The table 34 further includes a slot 202 aligned with the blade 22 and having a thickness corresponding to that of the blade 22 such that, during operation of the power tool 10, the blade 22 is at least partially received within the slot 202 when completing a cut on a work piece 42. Because the table 34 is rotationally fixed to the base 14, the slot 202 remains aligned with the blade 22 regardless of the orientation of the fence 38 and the type of cuts performed on the work pieces 42.

With reference to FIGS. 2 and 3, the power tool 10 includes a locking member 206 operable to selectively secure or lock the fence 38 to the table 34 and base 14. In the illustrated construction of the power tool 10, the locking member 206 includes a knob 210 and a threaded shank 214 extending from the knob 210. The table 34 includes a downwardly-extending boss 218 having a corresponding threaded aperture (not shown) in which the shank 214 is received. As such, to lock the fence 38 to the table 34 and base 14, the operator of the power tool 10 would rotate the knob 210 in a first direction (i.e., a clockwise direction) relative to the base 14, thereby increasing the threaded engagement between the shank 214 and the threaded aperture in the boss 218 and moving the table 34 toward the base 14 along the third axis 46 to clamp the fence 38 to the base 14. Likewise, to release the fence 38 from the table 34 and base 14, the operator of the power tool 10 would rotate the knob 210 in the opposite direction (i.e., a counter-clockwise direction) relative to the base 14, thereby decreasing the threaded engagement between the shank 214 and the threaded aperture in the boss 218, which, in turn, would allow the table 34 to be moved away from the base 14 along the third axis 46. Alternatively, the locking member 206 may be configured in any of a number of different ways to selectively lock the fence 38 to the table 34 and the base 14.

Figure 6:
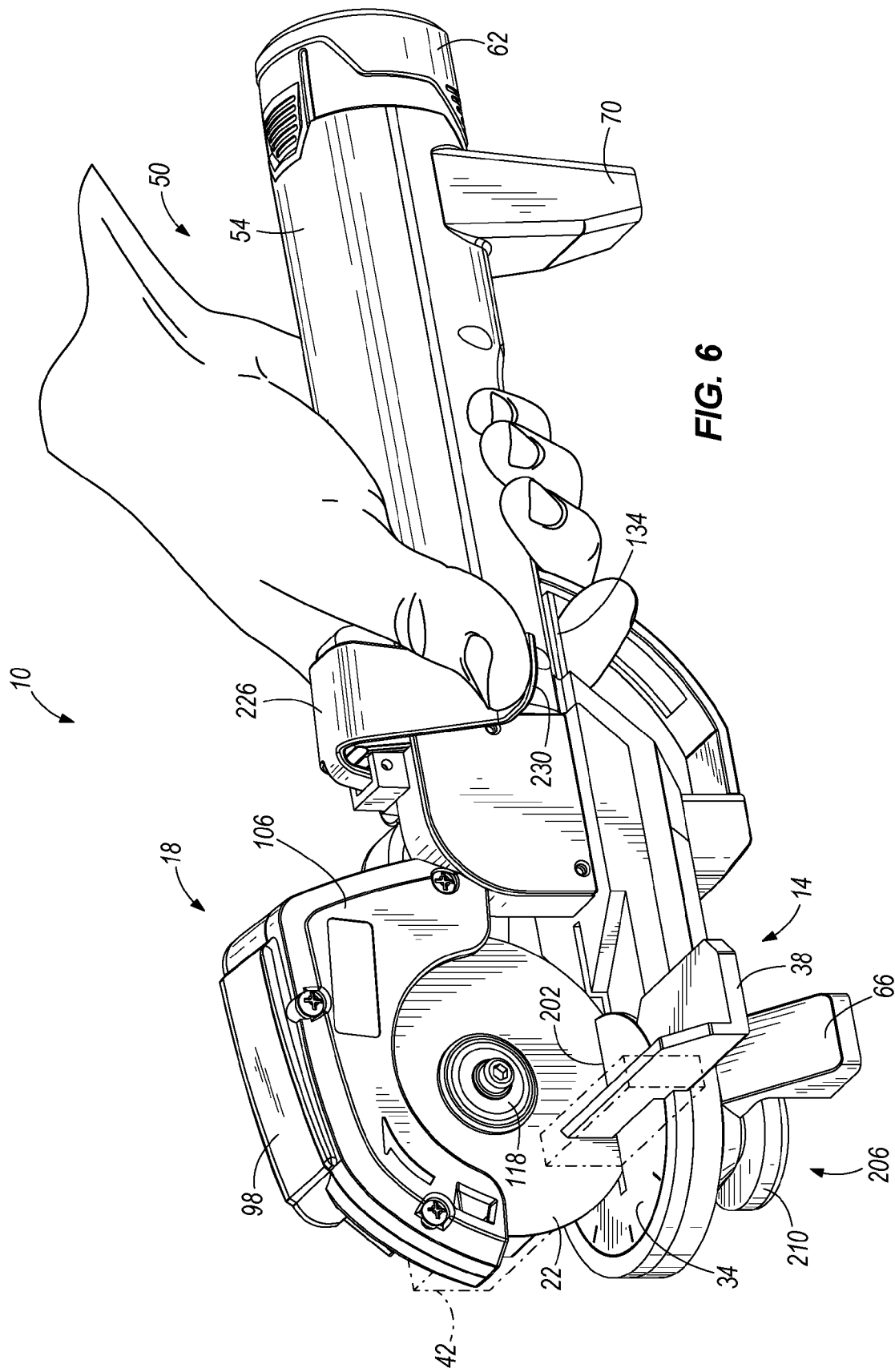
FIG. 6 is a front perspective view of the miter saw of FIG. 1, illustrating the user of the miter saw actuating a power switch of the miter saw.

With reference to FIGS. 1-3, the power tool 10 also includes a switch 222 (FIG. 2) electrically connecting the motor 58 and the power source (i.e., the battery 62 or a remote power source) and a trigger 226 manipulatable by an operator of the power tool 10 to selectively actuate the switch 222. In the illustrated construction of the power tool 10, the trigger 226 is pivotably coupled to the base 14 (e.g., using a pin) and includes opposed, substantially parallel tabs 230 that an operator may depress to pivot the trigger 226 to actuate the switch 222. In a further construction, the trigger 226 may be coupled to the base 14 in any of a number of different ways. By incorporating the opposed tabs 230 on the trigger 226, both right-handed operators and left-handed operators may utilize the power tool 10. With reference to FIG. 3, the switch 222 includes a button 234 that is depressed by the trigger 226 to actuate the switch 222, and a spring (not shown) operable to bias the button 234 in an upward direction with respect to the orientation of the power tool 10 shown in FIG. 3. The trigger 226 includes a downwardly-facing projection 238 engaged with the button 234 and operable to depress the button 234 to actuate the switch 222 when an operator of the power tool 10 depresses the trigger 226 (FIG. 6). Alternatively, the switch 222 may be configured as a non-contact switch such that direct contact between the switch 222 and the trigger 226 is not necessary to actuate the switch 222.

Figure 5:
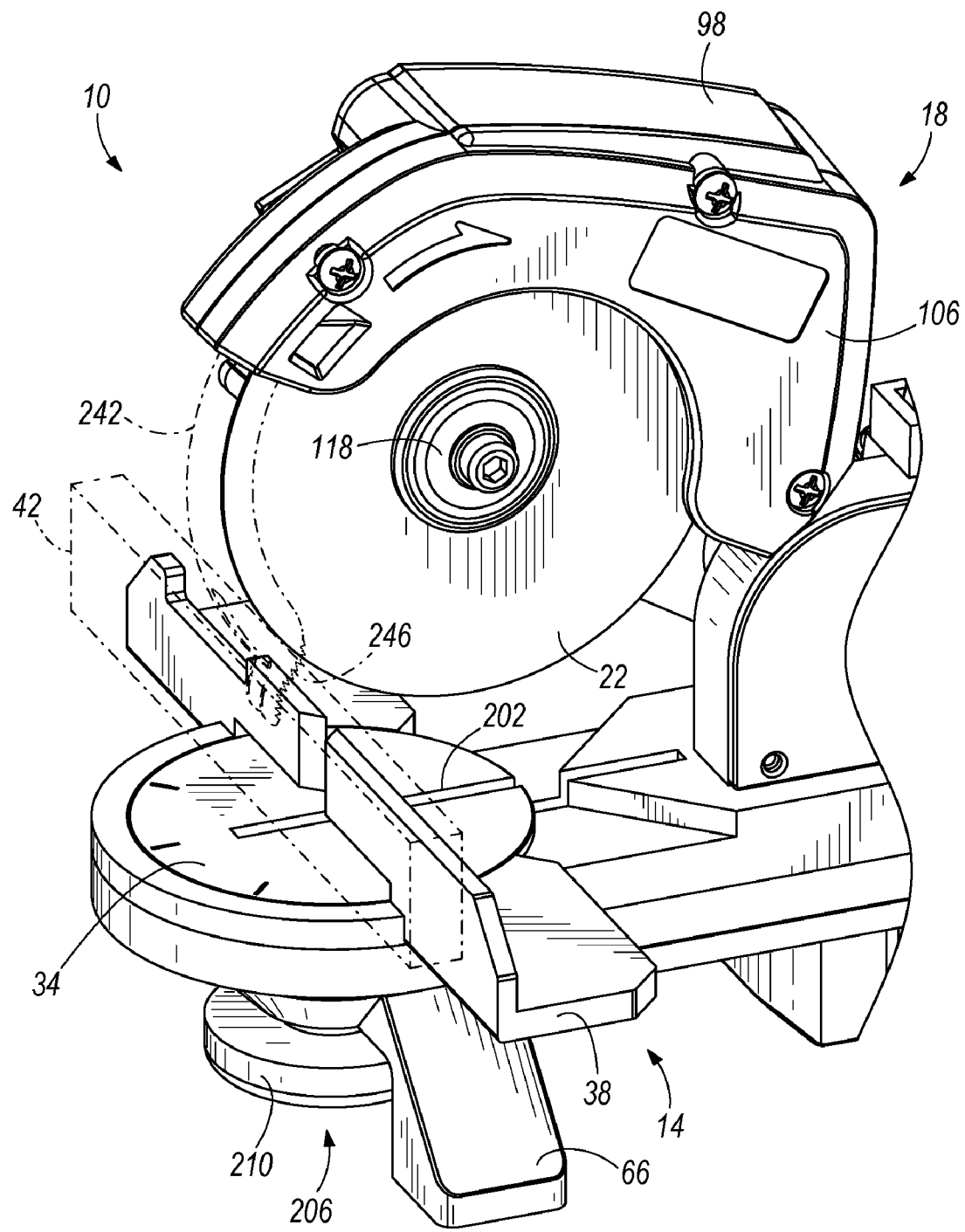
FIG. 5 is an enlarged view of a portion of the miter saw of FIG. 1, illustrating a lower blade guard clamping the work piece to a table of the miter saw.

With reference to FIG. 5, the power tool 10 also includes a spring-biased lower blade guard 242 that is pivotably retractable into the upper blade guard 106 while performing cuts on work pieces 42. The end of the lower blade guard 242 includes a plurality of gripping members 246 (e.g., serrated teeth) that, when engaged with the work piece 42 supported on the table 34, clamp the work piece 42 to the table 34 and against the fence 38 while the work piece 42 is being cut. Alternatively, the power tool 10 may include other clamps or features configured to secure a work piece 42 to the table 34 and against the fence 38. The blade guard 242 is pivotable about the blade axis 26 and independent of the blade housing 98 and upper blade guard 106. Further, the blade guard 242 may be transparent or translucent to allow the user of the power tool 10 to view the cutting interface between the blade 22 and the work piece 42.

In the illustrated construction of the power tool 10, the blade 22 includes a nominal diameter of about 3.375 inches to about 5.25 inches. Alternatively, the blade 22 may be larger or smaller. In addition, the power tool 10 may include an alignment device (e.g., a laser; not shown) projecting onto the work piece 42 to indicate the position of the blade 22 with respect to the work piece 42.

With reference to FIG. 4, the power tool 10 may be grasped by a user and utilized to cut a work piece 42 with a single hand. Specifically, a user may grasp the handle 50 or motor housing 54 of the power tool 10 in the palm of their hand, while using their index finger to actuate the lever 134 and their thumb to actuate the trigger 226. While a user of the power tool 10 may actuate the lever 134 and the trigger 226 to lower the saw unit 18 and initiate rotation of the blade 22, respectively, at substantially the same time, the user of the power tool 10 may also separately actuate the lever 134 to lower the saw unit 18 without initiating rotation of the blade 22 to align the blade 22 with respect to the work piece 42 supported on the table 14. After the user of the power tool 10 is satisfied with the alignment of the blade 22 with respect to the work piece 42 (i.e., using a laser alignment device or by visual inspection), the user may then depress the trigger 226 to initiate rotation of the blade 22 to cut the work piece 42.

While cutting the work piece 42, the user of the power tool 10 would continue to apply an upward force to the lever 134 (with respect to the orientation of the power tool 10 shown in FIGS. 4 and 6) to lower the saw unit 18 relative to the table 34 as the blade 22 progresses with its cut through the work piece 42 (FIG. 6). With continued reference to FIG. 6, the lower portion of blade 22 is received within the slot 202 in the table 34 at the conclusion of the cut through the work piece 42, and the lever 134 comes into contact with the base 14 to prevent further rotation or lowering of the saw unit 18 with respect to the table 34 and base 14. To raise the saw unit 18, the user of the power tool 10 need only to release the lever 134 to allow the torsion spring 130 acting between the base 14 and the transmission housing 102 of the saw unit 18 to return to its substantially undeflected shape and raise the saw unit 18. The trigger 226, once depressed, may engage the lever 134 such that the act of releasing the lever 134 automatically releases or causes the release of the trigger 226 to stop the motor 58 and the blade 22.

Figure 7:
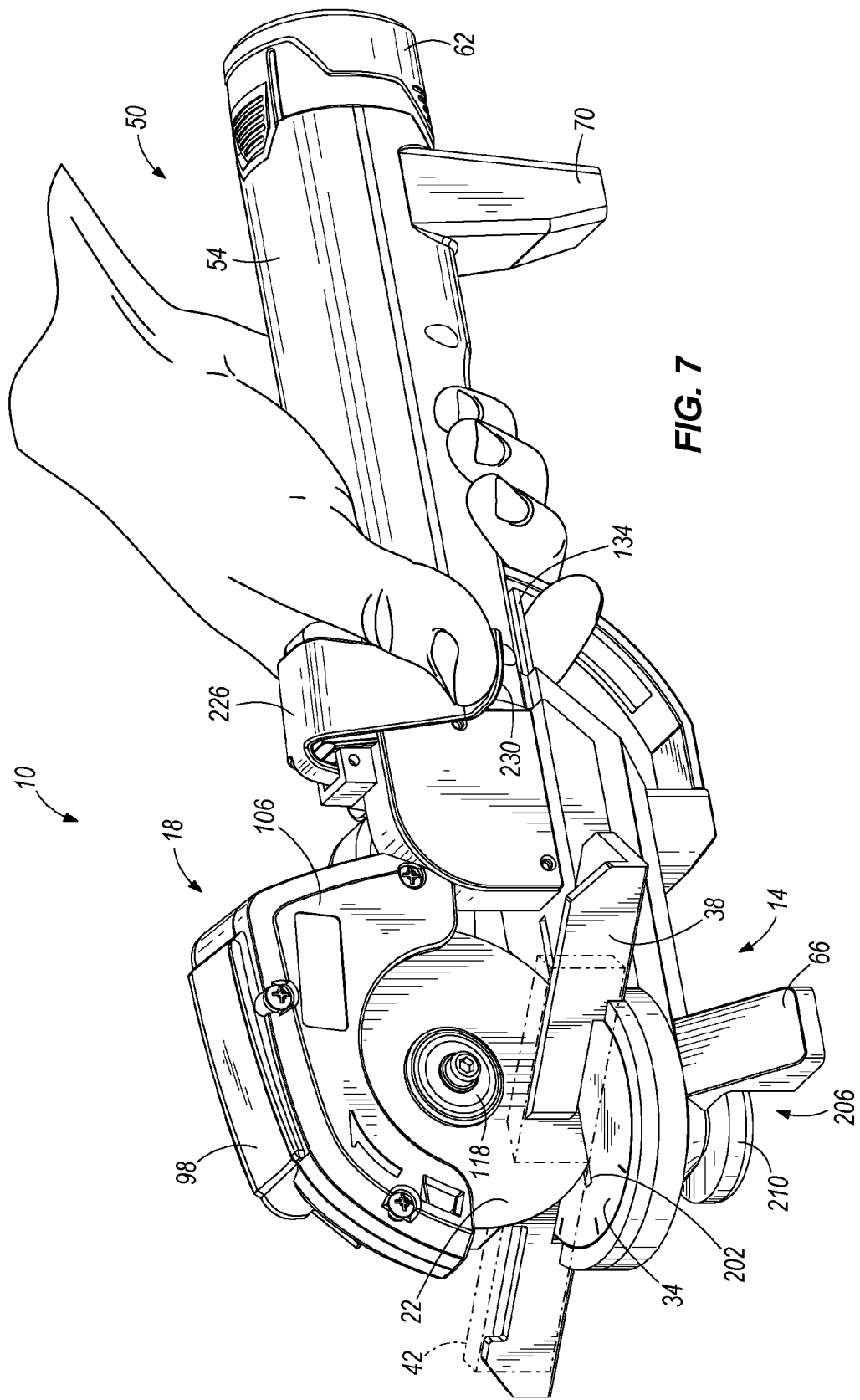
FIG. 7 is a front perspective view of the miter saw of FIG. 1, illustrating a fence of the miter saw oriented at an oblique angle relative to the miter saw blade.

Should the user of the power tool 10 decide to perform a miter cut on a work piece 42, the user would grasp the knob 210 of the locking member 206 and rotate the knob 210 in a counter-clockwise direction to decrease the threaded engagement between the shank 214 and the threaded aperture in the table boss 218 (FIGS. 2 and 3). This, in turn, allows the user to push the table 34 upwardly along the third axis 46 and unseat the table 34 from the cylindrical recess 190 in the fence 38. The user of the power tool 10 may then rotate the fence 38 about the third axis 46 to a desired position corresponding to the desired miter cut. The user of the power tool 10 would then grasp the knob 210 and rotate it in a clockwise direction to increase the threaded engagement between the shank 214 and the threaded aperture in the table boss 218 to re-seat the table within the cylindrical recess 190 of the fence 38 and clamp the fence 38 to the base 14. As discussed above, the power tool 10 may include a plurality of detents corresponding with typical miter angles to allow the operator of the power tool 10 to quickly and precisely adjust the position of the fence 38 to perform a miter cut. Finally, the user of the power tool 10 would perform the miter cut on a work piece 42 (FIG. 7) in a similar manner as that described above with respect to performing a straight cut on the work piece 42 (FIG. 6).

Various features of the invention are set forth in the following claims.

What is claimed is:

1. A hand-held power tool comprising:
   an electric motor;
   a motor housing in which the electric motor is at least partially positioned;
   a blade drivably coupled to the motor for rotation about a first axis;
   a blade housing in which the blade is at least partially positioned, the blade and the blade housing being pivotably coupled to the motor housing about a second axis substantially parallel to the first axis,
   a lever coupled to the blade housing and operable to pivot the blade housing and blade about the second axis; and
   a switch operable to electrically connect the electric motor with a power source, the switch being separately operable from the lever;
   wherein the motor housing includes an outer peripheral surface located radially outwardly of the motor, wherein the outer peripheral surface of the motor housing is graspable by a user of the power tool to hold and support the weight of the power tool when in use, and wherein the switch and lever are separately operable by a user of the power tool at the same time using a single hand.

2. The hand-held power tool of claim 1, wherein the blade and blade housing are pivotable together about the second axis.

3. The hand-held power tool of claim 1, further comprising a spring biasing the blade housing to a first position, wherein the lever is operable to pivot the blade housing about the second axis to a second position against the bias of the spring.

4. The hand-held power tool of claim 1, further comprising:
   a base including the motor housing; and
   a fence supported by the base for rotation about a third axis substantially normal to the first and second axes.

5. The hand-held power tool of claim 4, further comprising a locking mechanism operable to secure the fence to the base in a selected orientation about the third axis relative to the base.

6. The hand-held power tool of claim 4, further comprising a table supported by the base and operable to support a workpiece relative to the blade.

7. The hand-held power tool of claim 6, wherein the blade housing is a first blade housing, and wherein the power tool further comprises a second blade housing pivotable relative to the first blade housing about the first axis and operable to clamp the workpiece against at least one of the table and the fence.

8. The hand-held power tool of claim 1, further comprising:
   a bevel gear train drivably coupled to an output shaft of the electric motor; and
   a belt drivably coupling the bevel gear train and the blade.

9. A power tool comprising:
   an electric motor;
   a blade drivably coupled to the motor for rotation about a first axis;
   a base including a motor housing in which the electric motor is at least partially positioned;
   a fence supported by the base for rotation about a second axis substantially normal to the first axis;
   a blade housing in which the blade is at least partially positioned, the blade and the blade housing being pivotably coupled to the base about a third axis substantially parallel to the first axis;
   a lever coupled to the blade housing and operable to pivot the blade housing and blade about the third axis; and
   a switch operable to electrically connect the electric motor with a power source, the switch being separately operable from the lever;
   wherein the motor housing includes an outer peripheral surface located radially outwardly of the motor, wherein the outer peripheral surface of the motor housing is graspable by a user of the power tool to hold and support the weight of the power tool when in use, and wherein the switch and lever are separately operable by a user of the power tool at the same time using a single hand.

10. The power tool of claim 9, wherein the blade and blade housing are pivotable together about the third axis.

11. The power tool of claim 9, further comprising a spring biasing the blade housing to a first position, wherein the lever is operable to pivot the blade housing about the third axis to a second position against the bias of the spring.

12. The power tool of claim 9, further comprising a locking mechanism operable to secure the fence to the base in a selected orientation about the second axis relative to the base.

13. The power tool of claim 9, further comprising a table supported by the base and operable to support a workpiece relative to the blade.

14. The power tool of claim 13, wherein the blade housing is a first blade housing, and wherein the power tool further comprises a second blade housing pivotable relative to the first blade housing about the first axis and operable to clamp the workpiece against at least one of the table and the fence.

15. The power tool of claim 9, further comprising:
a bevel gear train drivably coupled to an output shaft of the electric motor; and
a belt drivably coupling the bevel gear train and the blade.

16. A power tool comprising:
an electric motor;
a blade drivably coupled to the motor for rotation about a first axis;
a base pivotably coupled to the blade about a second axis substantially parallel to the first axis;
a fence supported by the base for rotation about a third axis substantially normal to the first and second axes;
a blade housing in which the blade is at least partially positioned, the blade and the blade housing being pivotably coupled to the base about the second axis as a unit;
a lever coupled to the blade housing and operable to pivot the blade housing and blade about the second axis; and
a switch operable to electrically connect the electric motor with a power source, the switch being separately operable from the lever;
wherein the base includes a handle defining a longitudinal axis substantially normal to each of the first, second, and third axes, and wherein the handle is graspable by a user of the power tool to hold and support the weight of the power tool when in use, and wherein the switch and lever are separately operable by a user of the power tool at the same time using a single hand.

17. The power tool of claim 16, wherein the handle includes a motor housing in which the electric motor is at least partially positioned.

18. The power tool of claim 16, further comprising a spring biasing the blade housing to a first position, wherein the lever is operable to pivot the blade housing about the second axis to a second position against the bias of the spring.

19. The power tool of claim 16, further comprising a locking mechanism operable to secure the fence to the base in a selected orientation about the third axis relative to the base.

20. The power tool of claim 16, further comprising a table supported by the base and operable to support a workpiece relative to the blade.

21. The power tool of claim 20, further comprising a blade housing pivotable relative to the blade about the first axis and operable to clamp the workpiece against at least one of the table and the fence.

22. The power tool of claim 16, further comprising:
a bevel gear train drivably coupled to an output shaft of the electric motor; and
a belt drivably coupling the bevel gear train and the blade.

* * * * *